(12) United States Patent
Yuzawa et al.

(10) Patent No.: US 8,396,640 B2
(45) Date of Patent: Mar. 12, 2013

(54) VEHICLE SPEED LIMIT CONTROL DEVICE AND METHOD FOR CONTROLLING VEHICLE SPEED LIMIT

(75) Inventors: Hironori Yuzawa, Isehara (JP); Masahiro Iriyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 115 days.

(21) Appl. No.: 13/060,408

(22) PCT Filed: May 21, 2009

(86) PCT No.: PCT/JP2009/059310
§ 371 (c)(1), (2), (4) Date: Feb. 23, 2011

(87) PCT Pub. No.: WO2010/023998
PCT Pub. Date: Mar. 4, 2010

(65) Prior Publication Data
US 2011/0160978 A1 Jun. 30, 2011

(30) Foreign Application Priority Data

Aug. 28, 2008 (JP) ................................. 2008-219819
Mar. 16, 2009 (JP) ................................. 2009-062435

(51) Int. Cl.
*G05F 5/00* (2006.01)
(52) U.S. Cl. .......................................................... 701/93
(58) Field of Classification Search .................. 701/96, 701/84, 87
See application file for complete search history.

(56) References Cited

U.S. PATENT DOCUMENTS

| | | | | |
|---|---|---|---|---|
| 5,665,026 A | * | 9/1997 | Linden | 477/108 |
| 6,424,906 B1 | * | 7/2002 | Zhu et al. | 701/115 |
| 6,719,076 B1 | * | 4/2004 | Tabata et al. | 180/65.7 |
| 6,792,344 B2 | * | 9/2004 | Minowa et al. | 701/96 |
| 6,795,764 B2 | * | 9/2004 | Schmitz et al. | 701/93 |
| 7,054,733 B2 | * | 5/2006 | Kubota et al. | 701/96 |
| 7,200,480 B2 | * | 4/2007 | Kustosch | 701/93 |
| 7,315,772 B2 | * | 1/2008 | Tsutsumi et al. | 701/41 |
| 7,377,600 B2 | * | 5/2008 | Motoyama | 303/142 |
| 7,388,342 B2 | * | 6/2008 | Golownia et al. | 318/432 |
| 7,502,679 B2 | | 3/2009 | Tabata et al. | |
| 7,957,876 B2 | * | 6/2011 | Shiiba et al. | 701/70 |
| 8,280,569 B2 | * | 10/2012 | Kumar et al. | 701/20 |
| 2006/0060399 A1 | | 3/2006 | Tabata et al. | |

(Continued)

FOREIGN PATENT DOCUMENTS

JP    1-156143 A    6/1989
JP   11-294215 A   10/1999

(Continued)

*Primary Examiner* — Thomas Tarcza
*Assistant Examiner* — Alex C Dunn
(74) *Attorney, Agent, or Firm* — Foley & Lardner LLP

(57) ABSTRACT

A vehicle speed limit control device includes a vehicle speed limit setting portion that sets a vehicle speed limit according to a vehicle speed limit command value, a vehicle speed detecting portion, a driving force control portion, a vehicle speed limit command difference calculating portion that calculates a difference between an initial value of the vehicle speed limit command value immediately before an initial operation of the vehicle speed limit command processing and a changed value of the vehicle speed limit command value at a current operation, and a vehicle speed limit change rate regulating portion that regulates a rate of change of the vehicle speed limit by the vehicle speed limit setting portion in such a manner that the rate of change of the vehicle speed limit decreases with the vehicle speed limit command difference.

6 Claims, 6 Drawing Sheets

U.S. PATENT DOCUMENTS

2010/0318273 A1 * 12/2010 Aleksic et al. .................. 701/98

FOREIGN PATENT DOCUMENTS

| | | |
|---|---|---|
| JP | 2003-235103 A | 8/2003 |
| JP | 2003-252193 A | 9/2003 |
| JP | 2004-114988 A | 4/2004 |
| JP | 2006-94589 A | 4/2006 |
| JP | 2007-326429 A | 12/2007 |
| JP | 2009-018687 A | 1/2009 |

* cited by examiner

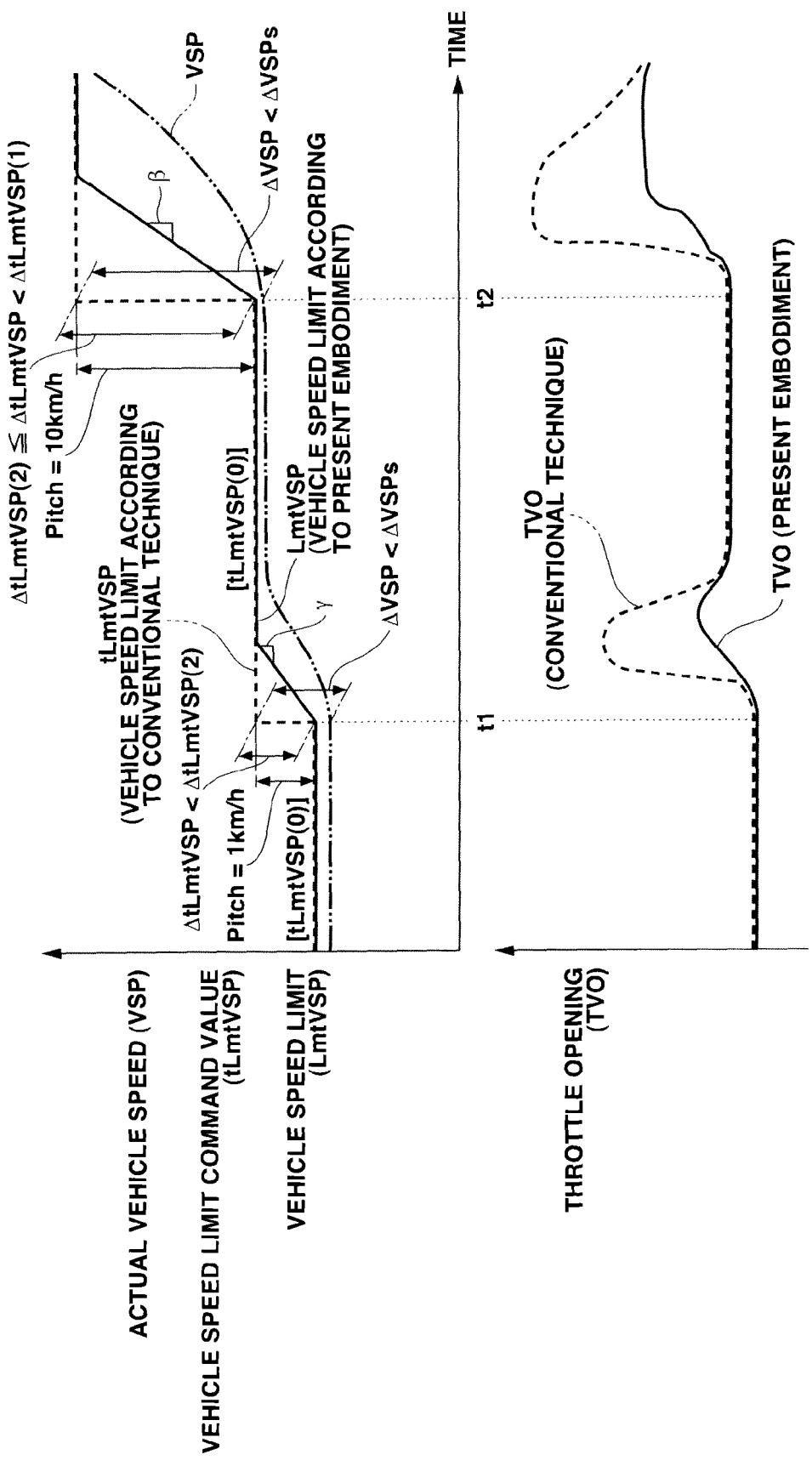

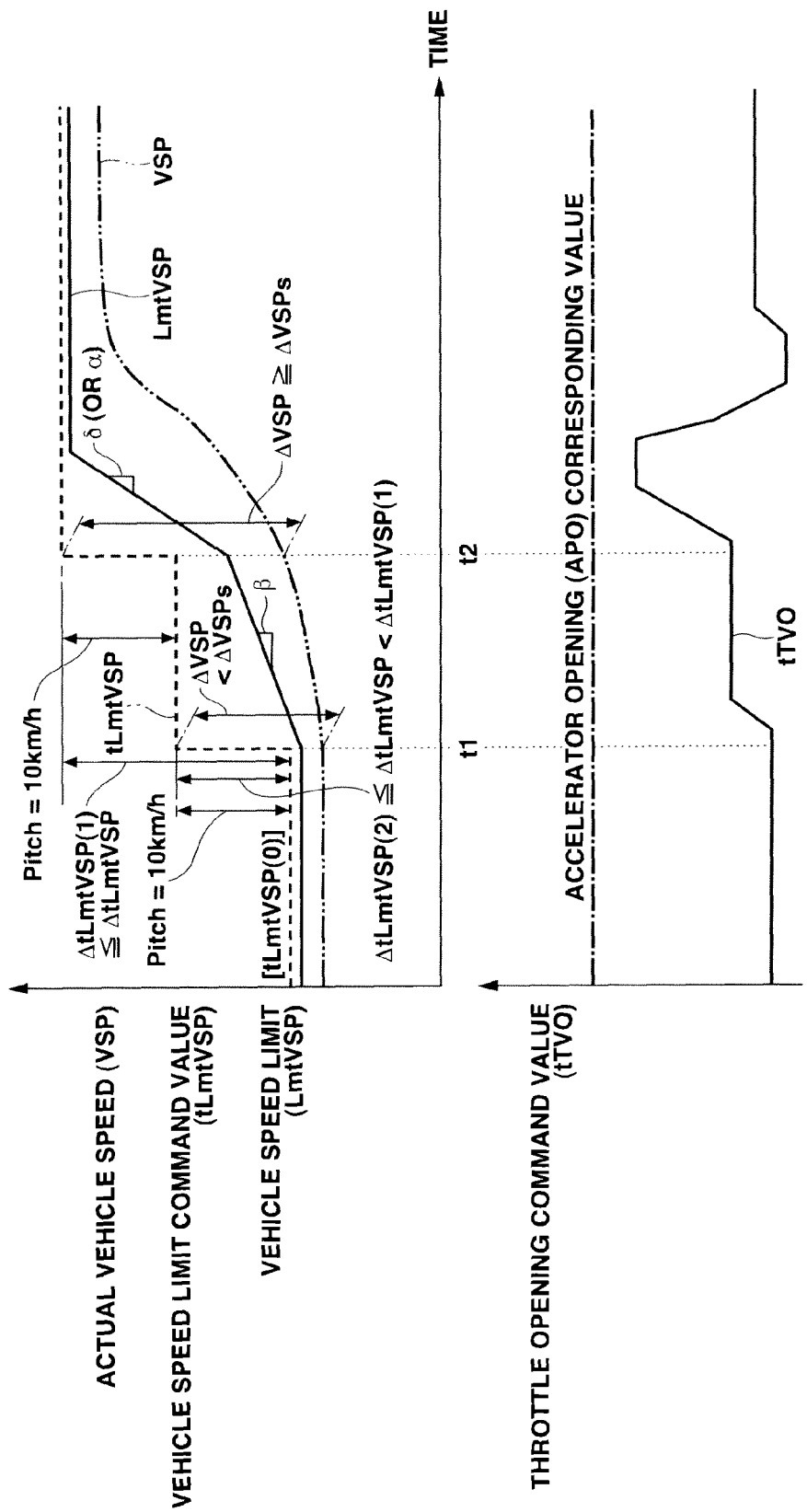

VEHICLE SPEED LIMIT CONTROL DEVICE AND METHOD FOR CONTROLLING VEHICLE SPEED LIMIT

TECHNICAL FIELD

The present invention relates to a vehicle speed limit control device and method for controlling a driving force of an automotive vehicle in such a manner that an actual vehicle speed of the vehicle does not exceed a vehicle speed limit.

BACKGROUND ART

A vehicle speed limit control device controls a driving force of an automotive vehicle in such a manner that, even when an accelerator pedal of the vehicle is largely depressed by a driver, an actual vehicle speed of the vehicle does not exceed a given set vehicle speed limit and thus provides a great advantage that it is possible to maintain the vehicle speed at the vehicle speed limit or lower so that the vehicle can be driven within the legal speed limits without driver's concern for the operation of the accelerator pedal. As such a vehicle speed limit control device, there is conventionally known one as disclosed in Patent Document 1. This vehicle speed limit control device is configured to control a maximum required engine operation load, such as an accelerator opening or a throttle opening, according to a vehicle speed deviation between the actual vehicle speed and the vehicle speed limit in such a manner that the actual vehicle speed does not exceed the vehicle speed limit.

PRIOR ART DOCUMENT

Patent Document

Patent Document 1: Japanese Laid-Open Patent Publication No. 11-294215

DISCLOSURE OF THE INVENTION

Problems to be Solved by the Invention

In the above conventional vehicle speed limit control device, when the driver manually command a vehicle speed limit changing operation so as to increase or decrease the vehicle speed limit stepwisely by a relatively large pitch of e.g. 10 km/h, the vehicle driving force becomes suddenly changed in a stepwise manner in response to the change of the vehicle speed limit. This causes more acceleration or deceleration than expected and thereby gives an uncomfortable feeling to the driver.

In these days, there has been a demand to change the vehicle speed limit by a relatively small pitch of e.g. 1 km/m. In the case of changing the vehicle speed limit by such a small pitch, the driver expects only a slight change in driving force. Nevertheless, the driver would experience a larger change in driving force than expected during the vehicle speed limit changing operation in which the vehicle speed limit is changed in the conventional stepwise manner. The uncomfortable feeling of the driver becomes thus more pronounced due to more acceleration or deceleration than expected.

In order to solve this problem, it is conceivable to change the vehicle speed limit at a given time change rate in response to the stepwise change of the driver's vehicle speed limit command value. Further, the time change rate of the vehicle speed limit (i.e. the speed of change of the vehicle speed limit) could conceivably be determined according to the degree of deviation between the actual vehicle speed and the vehicle speed limit command value. The time-series changes of the actual vehicle speed however differ depending on the running conditions under the influence of the running resistance (e.g. road inclination, air resistance) of the vehicle. It turns out that the time change rate of the vehicle speed limit, when determined according to the degree of deviation between the actual vehicle speed and the vehicle speed limit command value, changes with the time-series changes of the actual vehicle speed depending on the vehicle running conditions even when the vehicle driving operations (e.g. accelerator pedal depression amount) including the driver's vehicle speed limit command changing operation are the same. Even though the driver executes the same vehicle speed limit command changing operation under the same driving operation conditions, the time change rate of the vehicle speed limit may differ from its previous value. This becomes a large problem in practical use as the driver feels that it is difficult to learn the vehicle speed limit command changing operation due to the lack of repeatability of the vehicle speed limit with respect to the vehicle speed limit command changing operation and has an uncomfortable feeling due to the difference between the actual and expected time change rate of the vehicle speed limit during the vehicle speed limit command changing operation.

In view of the above circumstances, it is an object of the present invention to provide a vehicle speed limit control device and method in which a driver would not have an uncomfortable feeling due to a change in driving force caused by a sudden change of a vehicle speed limit during the execution of a vehicle speed limit changing command.

Means for Solving the Problems

There is provided according to one aspect of the present invention a vehicle speed limit control device for an automotive vehicle, comprising: a vehicle speed limit setting portion that sets and changes a vehicle speed limit of the vehicle according to a vehicle speed limit command value that can be changed depending on the number of operations of a vehicle speed limit command means in compliance with a given time condition; a vehicle speed detecting portion that detects an actual vehicle speed of the vehicle; a driving force control portion that controls a driving force of the vehicle based on the vehicle speed limit and the actual vehicle speed; a vehicle speed limit command difference calculating portion that calculates a vehicle speed limit command difference between an initial value of the vehicle speed limit command value immediately before an initial operation of the vehicle speed limit command means and a changed value of the vehicle speed limit command value at a current operation of the vehicle speed limit command means; and a vehicle speed limit change rate regulating portion that regulates a rate of change of the vehicle speed limit by the vehicle speed limit setting portion in such a manner that the rate of change of the vehicle speed limit decreases with the vehicle speed limit command difference.

There is provided according to another aspect of the present invention a vehicle speed limit control device for an automotive vehicle, comprising: a vehicle speed sensor that detects an actual vehicle speed of the vehicle; a vehicle speed limit command switch operated at a vehicle speed limit control request of a driver; and a vehicle speed limit control mechanism that sets a vehicle speed limit and controls a driving force of the vehicle in such a manner as to avoid the actual vehicle speed from exceeding the vehicle speed limit, wherein the vehicle speed limit control mechanism is configured to: change a vehicle speed limit command value depending on an operation condition of the vehicle speed limit command switch; change the vehicle speed limit according to the vehicle speed limit command value; calculate a vehicle speed limit command difference between an initial value of the vehicle speed limit command value immediately before an operation of the vehicle speed limit command switch and a current value of the vehicle speed limit command value changed by the operation of the vehicle speed limit command switch; when the vehicle speed limit command difference is greater than or equal to a predetermined first difference level, regulate a rate of change of the vehicle speed limit to a first change rate; when the vehicle speed limit command difference is smaller than a predetermined second difference level, regulate the rate of change of the vehicle speed limit to a second change rate that is smaller than the first change later; when the vehicle speed limit command difference is greater than or equal to the predetermined second difference level and is smaller than the predetermined first difference level, regulate the rate of change of the vehicle speed limit to a third change rate that is between the first change rate and the second change rate; and control the driving force of the vehicle based on the actual vehicle speed and the vehicle speed limit.

There is provided according to still another aspect of the present invention a vehicle speed limit control method for an automotive vehicle, the vehicle comprising a vehicle speed limit command switch operated at a vehicle speed limit control request of a driver, the vehicle speed limit control method comprising: detecting an actual vehicle speed of the vehicle; changing a vehicle speed limit command value depending on an operation condition of the vehicle speed limit command switch; changing a vehicle speed limit according to the vehicle speed limit command value; calculating a vehicle speed limit command difference between an initial value of the vehicle speed limit command value immediately before an operation of the vehicle speed limit command switch and a current value of the vehicle speed limit command value changed by the operation of the vehicle speed limit command switch; regulating a rate of change of the vehicle speed limit in such a manner that the rate of change of the vehicle speed limit decreases with the vehicle speed limit command difference; and controlling a driving force of the vehicle based on the actual vehicle speed and the vehicle speed limit.

BRIEF DESCRIPTION OF DRAWINGS

FIG. 5 is a time chart of a vehicle speed limit changing operation, which is different from that of FIG. 3, showing a process of setting of the vehicle speed limit during the execution of the control program of FIG. 2.

FIG. 6 is a time chart of a vehicle speed limit changing operation, which is different from those of FIGS. 3 and 5, showing a process of setting of the vehicle speed limit during the execution of the control program of FIG. 2.

BEST MODES FOR EMBODYING THE INVENTION

Hereinafter, the present invention will be described in detail below with reference to the drawings.

Figure 1:
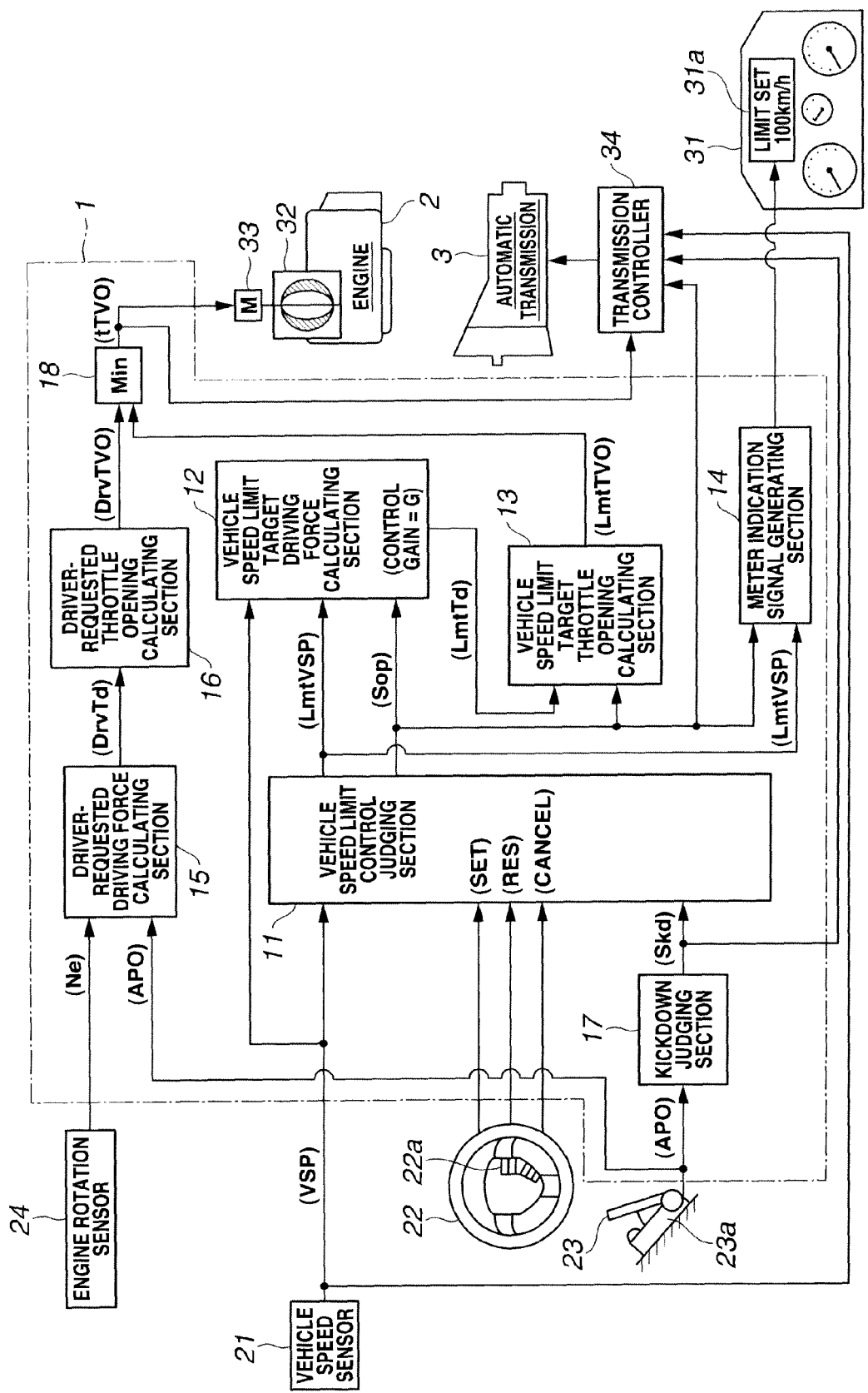
FIG. 1 is a function block diagram of a vehicle speed limit control device according to one embodiment of the present invention.

FIG. 1 shows a function block diagram of a vehicle speed limit control device for an automotive vehicle according to one embodiment of the present invention. In the drawing, reference numeral 2 denotes an engine as a power source; reference numeral 3 denotes an automatic transmission; and reference numeral 33 denotes a motor. The automotive vehicle has a power train provided with an engine 2 and an automatic transmission 3 so that the output power of the engine 1 is changed by the automatic transmission 3 at a gear ratio and transmitted to driving wheels (not shown) for driving of the vehicle. Further, the engine 2 has an electronically controlled throttle valve 32 whose opening degree is electronically controlled by a motor 33 to increase and decrease the engine output.

The vehicle speed limit control device includes a vehicle speed sensor 21 that detects an actual vehicle speed VSP of the vehicle, a vehicle speed limit control switch assembly 22a disposed on a steering wheel 22 of the vehicle and operated at a vehicle speed limit control request of a driver, a vehicle speed limit control mechanism 1 that sets a vehicle speed limit LmtTd according to an operation condition of the vehicle speed limit control switch assembly 22a and adjusts the output of the engine 2 in such a manner that the actual vehicle speed VSP does not exceed the vehicle speed limit LmtTd, an accelerator opening sensor 23a that detects a depression amount APO of an accelerator pedal 23 of the vehicle (accelerator opening) and an engine rotation sensor 24 that detects a rotation speed Ne of the engine 2. Herein, the vehicle speed limit control switch assembly 22a has a self-return "SET" switch, a self-return "RES" switch and a self-return "CANCEL" switch.

The vehicle speed limit control mechanism 1 has a vehicle speed limit control judging section 11, a vehicle speed limit target driving force calculating section 12, a vehicle speed limit target throttle opening calculating section 13, a meter indication signal generating section 14, a driver-requested driving force calculating section 15, a driver-requested throttle opening calculating section 16, a kickdown judging section 17 and a throttle opening command selecting section 18 and receives inputs of a signal from the vehicle speed sensor 21, a signal from the vehicle speed limit control switch assembly 22a (a "SET" signal from the SET switch, a "RES" signal from the RES switch or a "CANCEL" signal from the CANCEL switch), a signal from the accelerator opening sensor 23a and a signal from the engine rotation sensor 24.

The vehicle speed limit control judging section 11 executes or cancels vehicle speed limit control as follows in response to the SET signal, the RES signal or the CANCEL signal.

The driver, when wishes to execute the vehicle speed limit control in a state where no vehicle speed limit has yet been set after the actuation of an ignition switch (not shown) of the engine 2, pushes (turns on) and releases (turns off) the SET switch or the RES switch. In response to the input of the SET signal or the RES signal, the vehicle speed limit control judging section 11 sets the actual vehicle speed VSP at the time of operation of the corresponding switch as the vehicle speed limit LmtVSP and simultaneously outputs a vehicle speed limit control signal Sop indicating that the vehicle speed limit control should be executed.

After that, the vehicle speed limit control judging section 11 increases the vehicle speed limit LmtVSP by a small pitch of Pitch=1 km/h in response to the input of the SET signal when the driver turns on the SET switch for a short time (e.g. for less than 700 mset) and then turns off the SET switch (i.e. when the driver performs a single tap operation of the SET switch).

When the driver repeats such short-time operations of the SET switch in compliance with a given time condition (i.e. when the driver performs successive tap operations of the SET switch), the vehicle speed limit control judging section 11 increases the vehicle speed limit LmtVSP by a small pitch of Pitch=1 km/h in response to each of the successive, repeated inputs of the SET signal. It is herein judged that the short-time operations of the SET switch are repeated in compliance with the given time condition in the case where the SET switch is turned on by the next operation within a predetermined time period (e.g. 2 seconds) from the time the SET switch is turned off by the previous operation, i.e., in the case where the time interval between the previous turn-off action of the SET switch and the subsequent turn-on action of the SET switch is less than a predetermined time period (2 seconds). It is judged that the repeated short-time operations (successive tap operations) of the SET switch are completed in the case where the time interval between the previous turn-off action of the SET switch and the subsequent turn-on action of the SET switch is longer than or equal to the predetermined time period (2 seconds). The short-time operation of the SET switch immediately before such operation completion judgment is regarded as the last one of the successive tap operations; and the first short-time operation of the SET switch is naturally regarded as the initial one of the successive tap operations.

Similarly, the vehicle speed limit control judging section 11 decreases the vehicle speed limit LmtVSP by a small pitch of Pitch=1 km/h in response to the input of the RES signal when the driver turns on the RES switch for a short time (e.g. for less than 700 msec) and turns off the RES switch (i.e. when the driver performs a single tap operation of the RES switch).

When the driver repeats such short-time operations of the RES switch in compliance with a given time condition (i.e. when the driver performs successive tap operations of the RES switch), the vehicle speed limit control judging section 11 decreases the vehicle speed limit LmtVSP by a small pitch of Pitch=1 km/h in response to each of the successive, repeated inputs of the RES signal. It is herein judged that the short-time operations of the RES switch are repeated in compliance with the given time condition in the case where the RES switch is turned on by the next operation within a predetermined time period (e.g. 2 seconds) from the time the RES switch is turned off by the previous operation, i.e., in the case where the time interval between the previous turn-off action of the RES switch and the subsequent turn-on action of the RES switch is less than a predetermined time period (2 seconds). It is judged that the repeated short-time operations (successive tap operations) of the RES switch are completed in the case where the time interval between the previous turn-off action of the RES switch and the subsequent turn-on action of the RES switch is longer than or equal to the predetermined time period (2 seconds). The short-time operation of the RES switch immediately before such operation completion judgment is regarded as the last one of the successive tap operations; and the first short-time operation of the RES switch is naturally regarded as the initial one of the successive tap operations.

When the driver keeps on pushing (turns on) the SET switch for the above set time (700 msec) or more and then releases (turns off) the SET switch (i.e. when the driver performs a long tap operation of the SET switch), the vehicle speed limit control judging section 11 changes the increase pitch Pitch of the vehicle speed limit LmtVSP from its basic value of 1 km/h to 10 km/h and increases the vehicle speed limit LmtVSP quickly by such a large pitch of 10 km/h in response to the continuous input of the SET signal.

Similarly, when the driver keeps on pushing (turns on) the RES switch for the above set time (700 msec) or more and then releases (turns off) the RES switch (i.e. when the driver performs a long tap operation of the RES switch), the vehicle speed limit control judging section 11 changes the decrease pitch Pitch of the vehicle speed limit LmtVSP from its basic value of 1 km/h to 10 km/h and decreases the vehicle speed limit LmtVSP quickly by such a large pitch of Pitch=10 km/h in response to the continuous input of the RES signal.

When the driver performs such long tap operations of the SET switch or the RES switch in such a manner that the SET switch or the RES switch is turned on by the next operation within a predetermined time period (e.g. 2 seconds) from the time the SET switch or the RES switch is turned off by the previous operation (i.e. when the driver performs successive long tap operations of the SET switch or the RES switch), the vehicle speed limit control judging section 11 increases or decreases the vehicle speed limit LmtVSP quickly by a large pitch of Pitch=10 km/h in response to each of the successive, repeated inputs of the long-tap signal from the corresponding switch in the same manner as in the case of the above successive quick tap operations.

The driver, when wishes to cancel the vehicle speed limit control, pushes on the CANCEL switch. Then, the vehicle speed limit control judging section 11 interrupts the vehicle speed limit control signal Sop in response to the input of the CANCEL signal but, for the next vehicle speed limit control, maintains and stores therein a value of the vehicle speed limit LmtVSP at the time of interruption of the vehicle speed limit control signal Sop until the engine ignition switch becomes turned off. This makes it possible that, next time when the driver pushes the SET switch or the RES switch for the vehicle speed limit control, the vehicle speed limit control judging section 11 uses the stored vehicle speed limit LmtVSP as its initial value.

The kickdown judging section 17 judges, based on the accelerator opening APO, whether the vehicle is in a kickdown state where the accelerator pedal 23 is depressed to around a maximum depth. When the vehicle is in the kickdown state, the kickdown judging section 17 outputs a kickdown signal Skd. The kickdown judging section 17 does not output a kickdown signal Skd when the vehicle is not in the kickdown state. The vehicle speed limit control judging section 11 interrupts the vehicle speed limit control signal Sop in response to the input of the kickdown signal Skd. Further, the vehicle speed limit control judging section 11 interrupts the vehicle sped limit control signal Sop when the vehicle is in a low speed range where the vehicle speed VSP is lower than a predetermined vehicle speed level so that the vehicle speed limit control should not be executed. In the case of interrupting the vehicle speed limit control signal Sop in the kickdown state or the low speed range of the vehicle, the vehicle speed limit control judging section 11 also maintains and stores therein the value of the vehicle speed limit LmtVSP at the time of interruption of the vehicle speed limit control signal Sop for the next vehicle speed limit control until the engine ignition switch becomes turned off, and then, uses the stored vehicle speed limit LmtVSP as the initial value next time when the driver pushes the SET switch or the RES switch for the vehicle speed limit control.

The vehicle speed limit target driving force calculating section 12 receives inputs of the vehicle speed limit control signal Sop, the vehicle speed limit LmtVSP and the actual vehicle speed VSP and, during the presence of the vehicle speed limit control signal Sop, calculates a vehicle speed limit target driving force LmtTd to control a driving force of the vehicle on the basis of a predetermined control gain G according to a vehicle speed deviation between the vehicle speed limit LmtVSP and the actual vehicle speed VSP in such a manner that the actual vehicle speed VSP does not exceed the vehicle speed limit LmtVSP. In the absence of the vehicle speed limit control signal Sop, the vehicle speed limit target driving force calculating section 12 fixes the vehicle speed limit target driving force LmtTd at a maximum value corresponding to the maximum possible driving force.

The vehicle speed limit target throttle calculating section 13 calculates, based on the vehicle speed limit target driving force LmtTd and the vehicle speed limit control signal Sop, a vehicle speed limit target throttle opening LmtTVO to achieve the vehicle speed limit target driving force LmtTd. It is needless to say that, when the vehicle speed limit target driving force LmtTd is fixed at the maximum value corresponding to the maximum possible driving force, the vehicle speed limit target throttle opening LmtTVO is equal to a full throttle opening degree.

The meter indication signal generating section 14 generates a meter indication signal to indicate the vehicle speed limit LmtVSP on a vehicle speed limit indication area 31a of a metal panel 31 located in the front of a driver's seat of the vehicle, as shown in the drawing, during the presence of the vehicle speed limit control signal Sop. In the absence of the vehicle speed limit control signal Sop, the meter indication signal generating section 14 generates a meter indication signal to indicate "no vehicle speed limit settings" in place of the vehicle speed limit LmtVSP on the vehicle speed limit indication area 31a of the metal panel 31.

The driver-requested driving force calculating section 15 calculates, based on the accelerator opening APO and the engine rotation speed Ne with reference to a predetermined driving force map, a driving force DrvTd requested by the accelerator pedal operation of the driver at the current engine rotation speed Ne.

The driver-requested throttle opening calculating section 16 calculates a driver-requested throttle opening DrvTVO to achieve the driver-requested driving force DrvTd.

The throttle opening command selecting section 18 selects a smaller one Min(DrvTVO, LmtTVO) of the driver-requested throttle opening DrvTVO and the vehicle speed limit target throttle opening LmtTVO as a throttle opening command value tYVO and outputs the selected throttle opening command value tTVO=Min(DrvTVO, LmtTVO) to the motor 33 so that the throttle valve 32 can be electronically controlled by the motor 33 to adjust the opening of the throttle valve 32 according to the throttle opening command value tTVO.

In the above-structured vehicle speed limit control device, the vehicle speed limit control proceeds in the following procedure.

During the vehicle speed limit control where the vehicle speed limit control signal Sop is present, the vehicle speed limit target driving force LmtTd calculated by the vehicle speed limit target driving force calculating section 12 takes a value at which the condition of VSP (actual vehicle speed) >LmtVSP (vehicle speed limit) is not satisfied. In the case where the accelerator pedal 23 is largely depressed by the driver so that the driver-requested driving force DrvTd is greater than the vehicle speed limit target driving force LmtTd, the driver-requested throttle opening DrvTVO is larger than the vehicle speed limit target throttle opening LmtTVO. The selecting section 18 selects the smaller one of the driver-requested throttle opening DrvTVO and the vehicle speed limit target throttle opening LmtTVO, i.e., the vehicle speed limit target throttle opening LmtTVO as the throttle opening command value tTVO for the opening control of the electronically controlled throttle valve 32. The output of the engine 2 can be thus adjusted under the vehicle speed limit control in such a manner that the actual vehicle speed VSP does not exceed the vehicle speed limit LmtVSP even in the case where the accelerator pedal 23 is largely depressed by the driver.

Even under the vehicle speed limit control where the vehicle speed limit control signal Sop is present, the driver-requested throttle opening DrvTVO is smaller than the vehicle speed limit target throttle opening LmtTVO in the case where the amount of depression of the accelerator pedal 23 by the driver (accelerator opening APO) is small so that the driver-requested driving force DrvTd is smaller than the vehicle speed limit target driving force LmtTd. In such a case, the selecting section 18 selects the smaller one of the driver-requested throttle opening DrvTVO and the vehicle speed limit target throttle opening LmtTVO, i.e., the driver-requested throttle opening DrvTVO as the throttle opening command value tTVO for the opening control of the electronically controlled throttle valve 32. The output of the engine 2 can be thus adjusted to achieve the driver-requested driving force DrvTd and avoid interference with the normal running of the vehicle under the running conditions that the actual vehicle speed VSP does not exceed the vehicle speed limit LmtVSP without the accelerator pedal 23 being largely depressed by the driver.

In the case where: the CANCEL switch of the switch assembly 22a is pushed by the driver; the vehicle is in the kickdown state where the accelerator pedal 23 is depressed to around the maximum depth by the driver; or the vehicle speed VSP is in the very-low speed range, the vehicle speed limit control is not executed in the absence of the vehicle speed limit control signal Sop. At this time, the vehicle speed limit target driving force Lmt Td is fixed by the vehicle speed limit target driving force calculating section 12 at the maximum value corresponding to the maximum possible driving force. No matter how large the depression amount of the accelerator pedal 23 is, the driver-requested driving force DrvTd does not exceed the vehicle speed limit target driving force LmtTd. It means that the driver-requested throttle opening DrvTVO does not exceed the vehicle speed limit target throttle opening LmtTVD. The selecting section 18 keeps on selecting the driver-requested throttle opening DrvTVO as the throttle opening command value tTVO for the opening control of the electronically controlled throttle valve 32. The output of the engine 2 can be thus adjusted to achieve the driver-requested driving force DrvTd constantly and allow the normal running of the vehicle as intended during no vehicle speed limit control.

In the present embodiment, the automatic transmission 3 is designed as a multi-stage automatic transmission with 7 forward gear stages; and the gear shift control of the automatic transmission 3 is conducted by a transmission controller 34. The transmission controller 34 is herein configured to receive inputs of the actual vehicle speed VSP and the throttle opening command value tTVO from the vehicle speed sensor 21 and the selecting section 18, respectively, determine an optimal gear stage for the current running conditions based on the actual vehicle speed VSP and the throttle opening command value tTVO with reference to a predetermined shift pattern, and then, shift the automatic transmission 3 automatically from the currently selected gear stage to the determined optimal gear stage.

The process of setting of the vehicle speed limit LmtVSP by the vehicle speed limit control judging section 11 will be next explained below in detail with reference to FIGS. 2, 3, 5 and 6.

Before that, a conventional vehicle speed limit setting process of Patent Document 1 will be explained below.

In the conventional vehicle speed limit setting process, for example, as indicated by the broken line in FIG. 5, a vehicle speed limit command value tLmtVSP is increased by a small pitch of Pitch=1 km/h at the time instant t1 when there is generated a vehicle speed limit changing pitch command corresponding to such a small pitch of Pitch=1 km/h by the short input of the SET signal under the single tap operation of the SET switch. As also indicated by the broken line in FIG. 5, the vehicle speed limit command value tLmtVSP is increased by a large pitch of Pitch=10 km/h at the time instant t2 when there is generated a vehicle speed limit changing pitch command corresponding to such a large pitch of Pitch=10 km/h by the long input of the SET signal under the long tap operation of the SET switch. The above-obtained vehicle speed limit command value tLmtVSP is set as it is as the vehicle speed limit VmtVSP in the conventional vehicle speed limit setting process.

In this case, the vehicle speed limit command value tLmtVSP is changed stepwisely at the time instants t1 and t2. There thus occur sudden changes in the throttle opening TVO, which is determined to achieve the target driving force for the vehicle speed limit, immediately after the time instants t1 and t2 as indicated by the broken line in FIG. 5. As a result, the driver experiences an uncomfortable feeling due to more acceleration than excepted even at the time instant t2 when the vehicle speed limit is increased by a large pitch of Pitch=10 km/h. At the time instant t1 when the vehicle speed limit is increased by a small pitch of Pitch=1 km/h, the driver expects only a slight change in driving force corresponding to such a small pitch and thus experiences a more uncomfortable feeling. This driver's uncomfortable feeling problem also similarly arises in the case where the vehicle speed limit command value tLmtVSP is decreased by a small pitch of Pitch=1 km/h or a large pitch of Pitch=10 km/h under a vehicle speed limit changing pitch command corresponding to such a pitch of 1 km/h or 10 km/h by the input of the RES signal and is set as it is as the vehicle speed limit LmtVSP.

In order to solve the above driver's uncomfortable feeling problem, the present embodiment is configured to change the vehicle speed limit LmtVSP gradually at a given time change rate in response to the change of the vehicle speed limit command value tLmtVSP without setting the vehicle speed limit command value tLmtVSP as it is as the vehicle speed limit LmtVSP.

Figure 2:
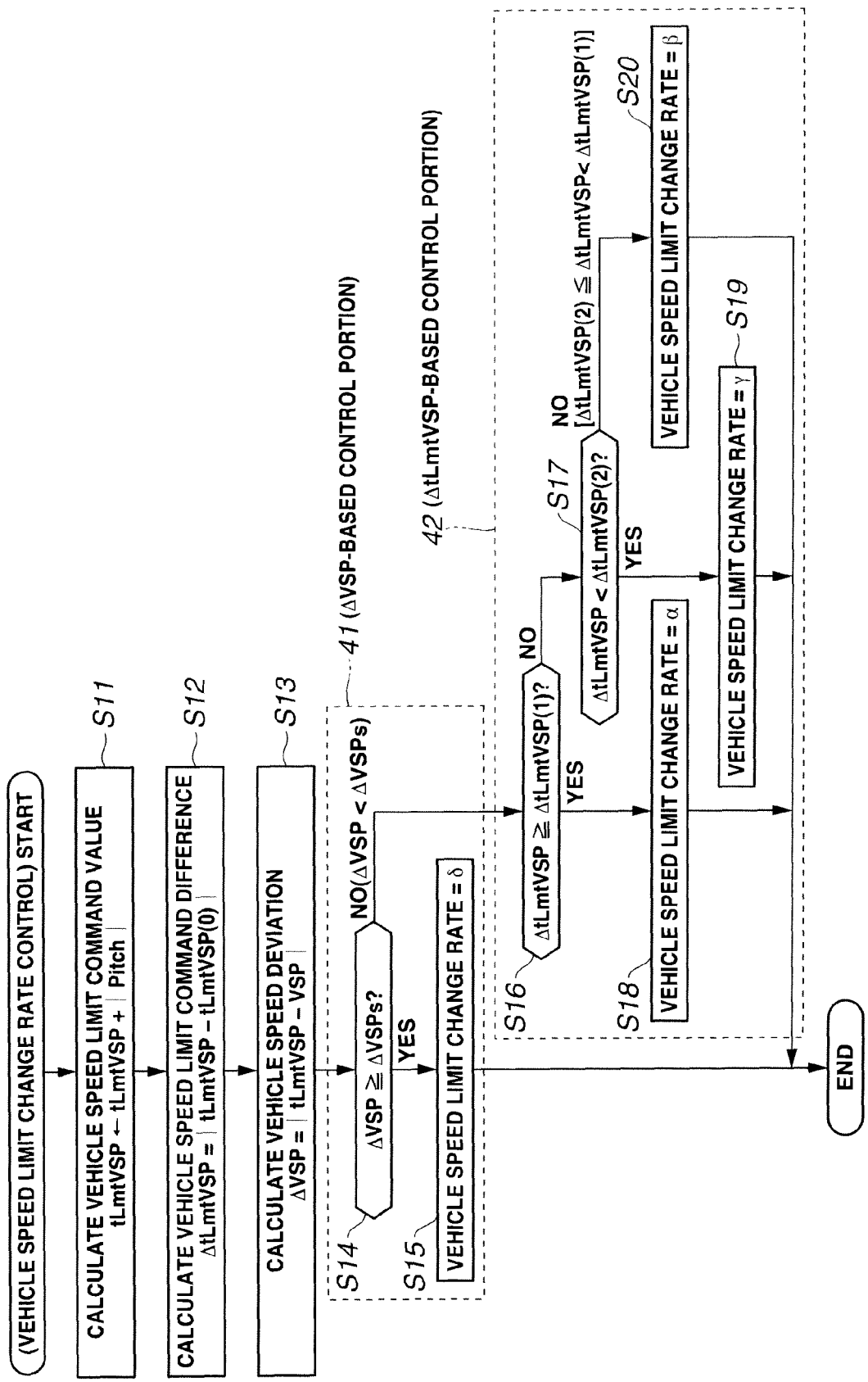
FIG. 2 is a flowchart of a control program executed by the vehicle speed limit control device of FIG. 1 to determine a time change rate of a vehicle speed limit.

The time change rate of the vehicle speed limit LmtVSP can be determined as follows by the execution of a control program shown in FIG. 2.

At step S11, a current changed value of the vehicle speed limit command value tLmtVSP is calculated by the vehicle speed limit control judging section 11 with the addition of a vehicle speed limit changing pitch command value |Pitch| to a previous value of the vehicle seed limit command value tLmtVSP.

At step S12, a vehicle speed limit command difference $\Delta$tLmtVSP between the current changed vehicle speed limit command value tLmtVSP obtained at step S11 and an initial vehicle speed limit command value tLmtVSP(0) before the single tap operation, the successive tap operations, the long tap operation etc. is calculated by the vehicle speed limit control judging section 11 as follows: $\Delta$tLmtVSP=|tLmtVSP−tLmtVSP(0)|.

At step S13, a vehicle speed deviation $\Delta$VSP between the current changed vehicle speed limit command value tLmtVSP obtained at step S11 and the actual vehicle speed VSP is calculated as follows: $\Delta$VSP=|tLmtVSP−VSP|.

After the calculations of steps S11 to S13, the control goes to a $\Delta$VSP-based control portion 41.

The $\Delta$VSP-based control portion 41 is configured to perform vehicle speed limit change rate regulation control at steps S14 and S15 on the basis of the vehicle speed deviation $\Delta$VSP obtained at step S13.

At step S14, it is checked whether the vehicle speed deviation $\Delta$VSP is greater than or equal to a predetermined vehicle speed deviation level $\Delta$VSPs. The predetermined vehicle speed deviation level $\Delta$VSPs is herein set to e.g. 19 km/h that is larger than a pitch of 10 km/h and is slightly smaller than a pitch of 20 km/h, corresponding to a lower limit of vehicle speed limit changing pitch at which higher priority should be placed on the following response of the vehicle speed limit LmtVSP to the vehicle speed limit command value tLmtVSP rather than on the resolution of the driver's uncomfortable feeling problem caused due to the change in driving force. If $\Delta$VSP$\geq\Delta$VSPs at step S14, the control goes to step S15 upon judging that high priority should be placed on the following response of the vehicle speed limit LmtVSP to the vehicle speed limit command value tLmtVSP. If $\Delta$VSP<$\Delta$VSPs at step S14, the control goes to a $\Delta$tLmtVSP-based control portion 42 upon judging that higher priority should be placed on the resolution of the driver's uncomfortable feeling problem caused due to the change in driving force.

At step S15, the time change rate of the vehicle speed limit LmtVSP (the speed of change of the vehicle speed limit LmtVSP) is set to a large value $\delta$. This time change rate $\delta$ is determined so as to achieve the following response of the vehicle speed limit LmtVSP to the vehicle speed limit command value tLmtVSP as required in a large vehicle speed deviation range. Although the time change rate $\delta$ of the vehicle speed limit LmtVSP can be a fixed value, it is desirable that the time change rate $\delta$ of the vehicle speed limit LmtVSP increases with the vehicle speed deviation $\Delta$VSP so as to achieve the following response of the vehicle speed limit LmtVSP to the vehicle speed limit command value tLmtVSP assuredly as requested no matter what value the vehicle speed deviation $\Delta$VSP takes. It is needless to say that, in either case, the time change rate $\delta$ of the vehicle speed limit LmtVSP at which higher priority is placed on the following response of the vehicle speed limit LmtVSP to the vehicle speed limit command value tLmtVSP is set to be larger than or equal to the after-mentioned time change rate $\alpha$, $\beta$, $\gamma$ of the vehicle speed limit LmtVSP at which higher priority is placed on the resolution of the driver's uncomfortable feeling problem caused due to the change in driving force.

The $\Delta$tLmtVSP-based control portion 42 is configured to perform vehicle speed limit change rate regulation control at steps S16 to S20 on the basis of the vehicle speed limit command difference $\Delta$tLmtVSP obtained at step S12.

At step S16, it is checked whether the vehicle speed limit command difference $\Delta$tLmtVSP is greater than or equal to a predetermined, relatively large first vehicle speed limit command difference level $\Delta$tLmtVSP(1). The first vehicle speed limit command difference level $\Delta$tLmtVSP(1) is set for the same purpose as that for the vehicle speed limit deviation level $\Delta$VSPs but for comparison with the vehicle speed limit command difference ΔtLmtVSP and is thus set to e.g. 15 km/s that is slightly smaller than the vehicle speed limit deviation level ΔVSPs=19 km/h. If ΔtLmtVSP≧ΔtLmtVSP(1) at step S16, the control goes to step S18. If ΔtLmtVSP<ΔtLmtVSP(1) at step S16, the control goes to step S17.

At step S17, it is checked whether the vehicle speed limit command difference ΔtLmtVSP is smaller a predetermined, relatively small second vehicle speed limit command difference level ΔtLmtVSP(2). The second vehicle speed limit command difference level ΔtLmtVSP(2) is set to e.g. 4.8 km/h, corresponding to an upper limit of vehicle speed limit changing pitch at which higher priority should be placed on the resolution of the driver's uncomfortable feeling problem caused due to the change in driving force rather than on the following response of the vehicle speed limit LmtVSP to the vehicle speed limit command value tLmtVSP. If ΔtLmtVSP<ΔtLmtVSP(2) at step S17, the control goes to step S19. The control goes to step S20 if ΔtLmtVSP≧ΔtLmtVSP(2) at step S17 i.e. ΔtLmtVSP(2)≦ΔtLmtVSP<ΔtLmtVSP(1).

At step S18, the time change rate of the vehicle speed limit LmtVSP is set to a value α that is smaller than or equal to the time change rate value δ set at step S15. This time change rate α is determined so as to be neither too large nor too small for the resolution of the driver's uncomfortable feeling problem caused due to the change in driving force in a large vehicle speed limit command difference range.

At step S19, the time change rate of the vehicle speed limit LmtVSP is set to a small value γ. This time change rate γ is determined so as to be neither too large nor too small for the resolution of the driver's uncomfortable feeling problem caused due to the change in driving force in a small vehicle speed limit command difference range.

At step S20, the time change rate of the vehicle speed limit LmtVSP is set to a middle value β that is between the large time change rate value α and the small time change rate value γ. This time change rate β is determined so as to be neither too large nor too small for the resolution of the driver's uncomfortable feeling problem caused due to the change in driving force in a middle vehicle speed limit command difference range.

As is clear from the above explanations, the vehicle speed sensor 21 corresponds to a vehicle speed detecting portion of the present invention; the SET and RES switches of the vehicle speed limit control switch assembly 22a corresponds to a vehicle speed limit command mean of the present invention; the vehicle speed limit control judging section 11 corresponds to a vehicle speed limit setting portion (or means) of the present invention; and the vehicle speed limit target driving force calculating section 12 corresponds to a driving force control portion (or means) of the present invention. Further, step S12 corresponds to a vehicle speed limit command difference calculating portion (or means) of the present invention; step S13 corresponds to a vehicle speed deviation calculating portion (or means) of the present invention; step S15 corresponds to a vehicle speed limit change rate control portion (or means) of the present invention; and steps S18, S19 and S20 correspond to a vehicle speed limit change rate regulating portion (or means) of the present invention.

During the execution of the control program of FIG. 2, the vehicle speed limit control judging section 11 changes the vehicle speed limit LmtVSP at the given time change rate α, β, γ or δ as follows when the vehicle speed limit command value tLmtVSP becomes changed under the vehicle speed limit changing pitch command corresponding to a pitch of 1 km/h or 10 km/h by the input of the SET signal or the RES signal.

Figure 3:
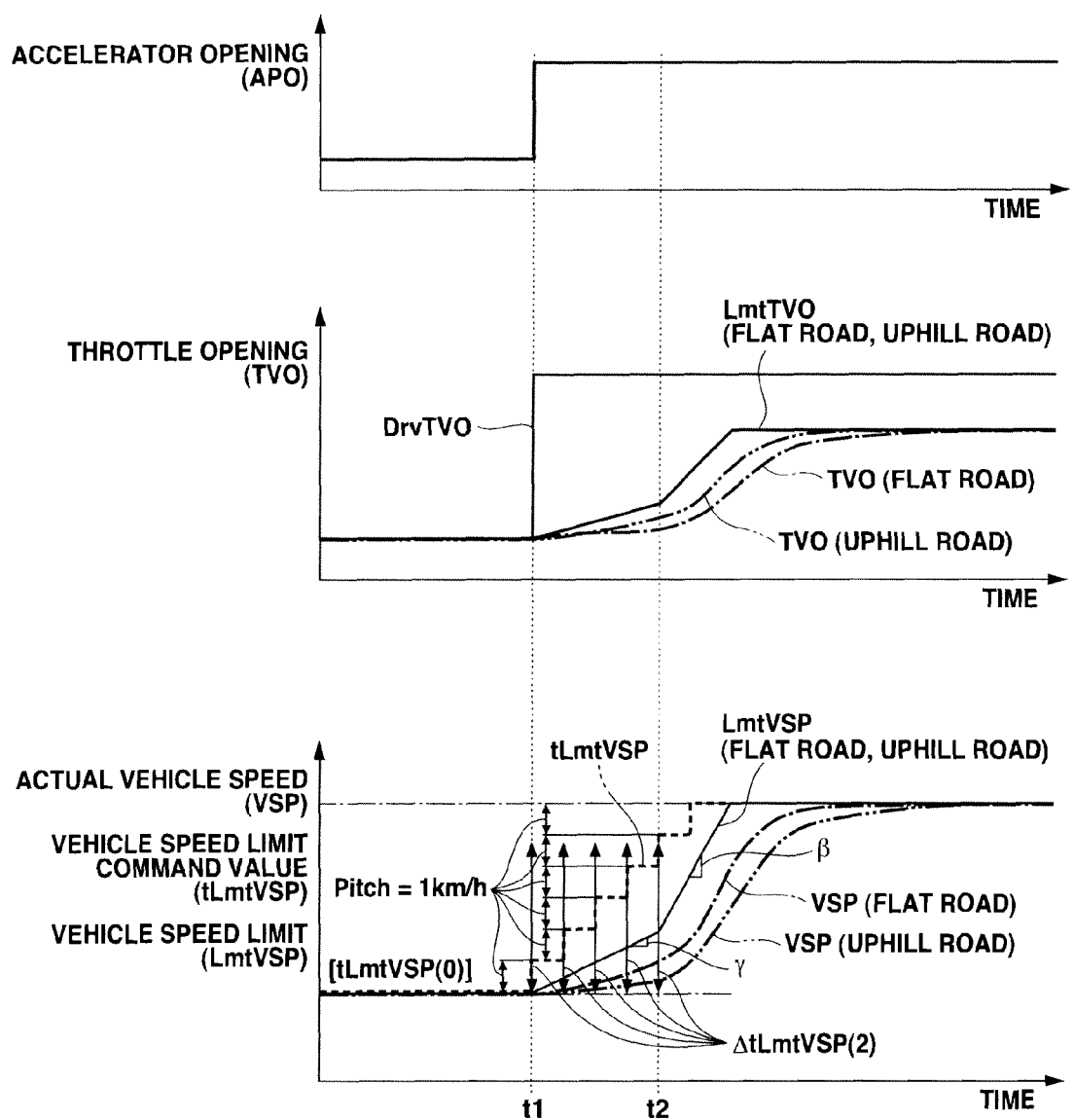
FIG. 3 is a time chart of a vehicle speed limit changing operation showing a process of setting of the vehicle speed limit during the execution of the control program of FIG. 2.

FIG. 3 shows changes of the vehicle speed limit command value tLmtVSP with respect to time in the case of repeating six short-time operations of the SET switch in compliance with the given time condition (i.e. in the case of performing six successive tap operations of the SET switch) after the accelerator pedal depression time t1.

After the time instant t1, the vehicle speed limit command value tLmtVSP is increased from the initial vehicle speed limit command value tLmtVSP(0) by a small pitch of Pitch=1 km/h by each of the six successive tap operations of the SET switch as indicated by the broken line. The vehicle speed limit command difference ΔtLmtVSP between the current vehicle speed limit command value tLmtVSP and the initial vehicle speed limit command value tLmtVSP(0) is also increased by 1 km/h by each of the successive tap operations of the SET switch.

Up until the time instant t2, the vehicle speed deviation ΔVSP is smaller than the predetermined vehicle speed deviation level ΔVSPs (step S14); the vehicle speed limit command difference ΔtLmtVSP is smaller than the predetermined first vehicle speed limit command difference level ΔtLmtVSP(1) (step S16); and the vehicle speed limit command difference ΔtLmtVSP is equal to the predetermined second vehicle speed limit command difference level ΔtLmtVSP(2)=4.8 km/h (step S17). The time change rate of the vehicle speed limit LmtVSP is thus set to a small value γ (step S19). The vehicle speed limit LmtVSP is gradually increased at such a small time change rate γ as indicated by the solid line relative to the successive stepwise change of the vehicle speed limit command value tLmtVSP during the time period from the time instant t1 to the time instant t2.

After the time instant t2, the vehicle speed limit command difference ΔtLmtVSP is greater than or equal to the predetermined second vehicle speed limit command difference level ΔtLmtVSP(2) (step S17). The time change rate of the vehicle speed limit LmtVSP is thus set to a middle value β (step S20). The vehicle speed limit LmtVSP is gradually increased to the vehicle speed limit command value tLmtVSP at such a middle time change rate β, as indicated by the solid line, relative to the successive stepwise changes of the vehicle speed limit command value tLmtVSP after the time instant t2.

In this way, the vehicle speed limit LmtVSP is not changed stepwisely in response to the change of the vehicle speed limit command value tLmtVSP but is gradually changed to the changed vehicle speed limit command value tLmtVSP at the given time change rate γ, β. The vehicle speed limit target throttle opening LmtTVO, which is determined to achieve the target driving force for the vehicle speed limit LmtVSP, becomes smoothly changed after the time instant t1 as indicated by the solid thick line in FIG. 3 by changing the vehicle speed limit LmtVSP at the time change rate γ, β depending on the vehicle speed limit command difference ΔtLmtVSP. It is accordingly possible to control the vehicle speed limit LmtVSP according to the vehicle speed limit command value tLmtVSP without causing a large change in driving force due to a sudden change of the vehicle speed limit LmtVSP and thereby without giving an uncomfortable feeling to the driver.

As already mentioned before, the uncomfortable feeling of the driver caused by the large change in driving force due to the sudden change of the vehicle speed limit LmtVSP becomes more pronounced as the vehicle speed limit command difference ΔtLmtVSP decreases. In the present embodiment, the change rate of the vehicle speed limit LmtVSP decreases with the vehicle speed limit command difference ΔtLmtVSP. It is thus possible to eliminate the uncomfortable feeling of the driver assuredly no matter what value the vehicle speed limit command difference ΔtLmtVSP takes, i.e., no matter how the vehicle speed limit command changing operation of the vehicle speed limit control switch 22a is performed.

The vehicle speed limit command difference ΔtLmtVSP, used for determination of the change rate of the vehicle speed limit LmtVSP, refers to the difference between the initial vehicle speed limit command value tLmtVSP(0) immediately before the first initial operation of the vehicle speed limit control switch 22a and the changed vehicle speed limit command value tLmtVSP at the current operation of the vehicle speed limit control switch 22a. As both of the initial vehicle speed limit command value tLmtVSP(0) and the current changed vehicle speed limit command value tLmtVSP are not influenced by the running conditions such as road inclination etc. of the vehicle, the vehicle speed limit command difference ΔtLmtVSP is the same under the same vehicle speed limit command changing operation of the vehicle speed limit control switch 22a without the influence of the vehicle running conditions. The vehicle speed limit change rate, which depends on the vehicle speed limit command difference ΔtLmtVSP, is also the same without the influence of the vehicle running conditions such as road inclination as is apparent from the time-series changes of the vehicle speed limit LmtVSP as indicated by the solid line in FIG. 3. It is thus possible to secure the repeatability of the vehicle speed limit LmtVSP with respect to the vehicle speed limit command changing operation so that the driver can always feel the same time change rate of the vehicle speed limit LmtVSP under the same vehicle speed limit command changing operation and thus can easily learn the vehicle speed limit command changing operation. It is also possible, for the same reason as above, to secure agreement between the actual and expected time change rate of the vehicle speed limit LmtVSP during the vehicle speed limit command changing operation and resolve the driver's uncomfortable feeling problem cause due to the difference between the actual and expected time change rate of the vehicle speed limit LmtVSP.

Even when the accelerator opening APO is the same, the time-series changes of the actual vehicle speed VSP differ depending on the running resistance such as road inclination of the vehicle. For example, the time-series changes of the throttle opening TVO and the actual vehicle speed VSP under low running resistance conditions such as on a flat road are indicated by the dashed dotted line in FIG. 3; and the time-series changes of the throttle opening TVO and the actual vehicle speed VSP under high running resistance conditions such as on an uphill road are indicated by the dashed double-dotted line in FIG. 3. When the time change rate of the vehicle speed limit LmtVSP is determined according to the degree of deviation between the actual vehicle speed VSP and the vehicle speed limit command value tLmtVSP irrespective of the fact that the time-series changes of the actual vehicle speed VSP differ depending on the running resistance such as road inclination of the vehicle, there arises a problem that the time change rate of the vehicle speed limit LmtVSP differs whereby the repeatability of the vehicle speed limit LmtVSP with respect to the vehicle speed limit changing operation cannot be obtained.

Figure 4:
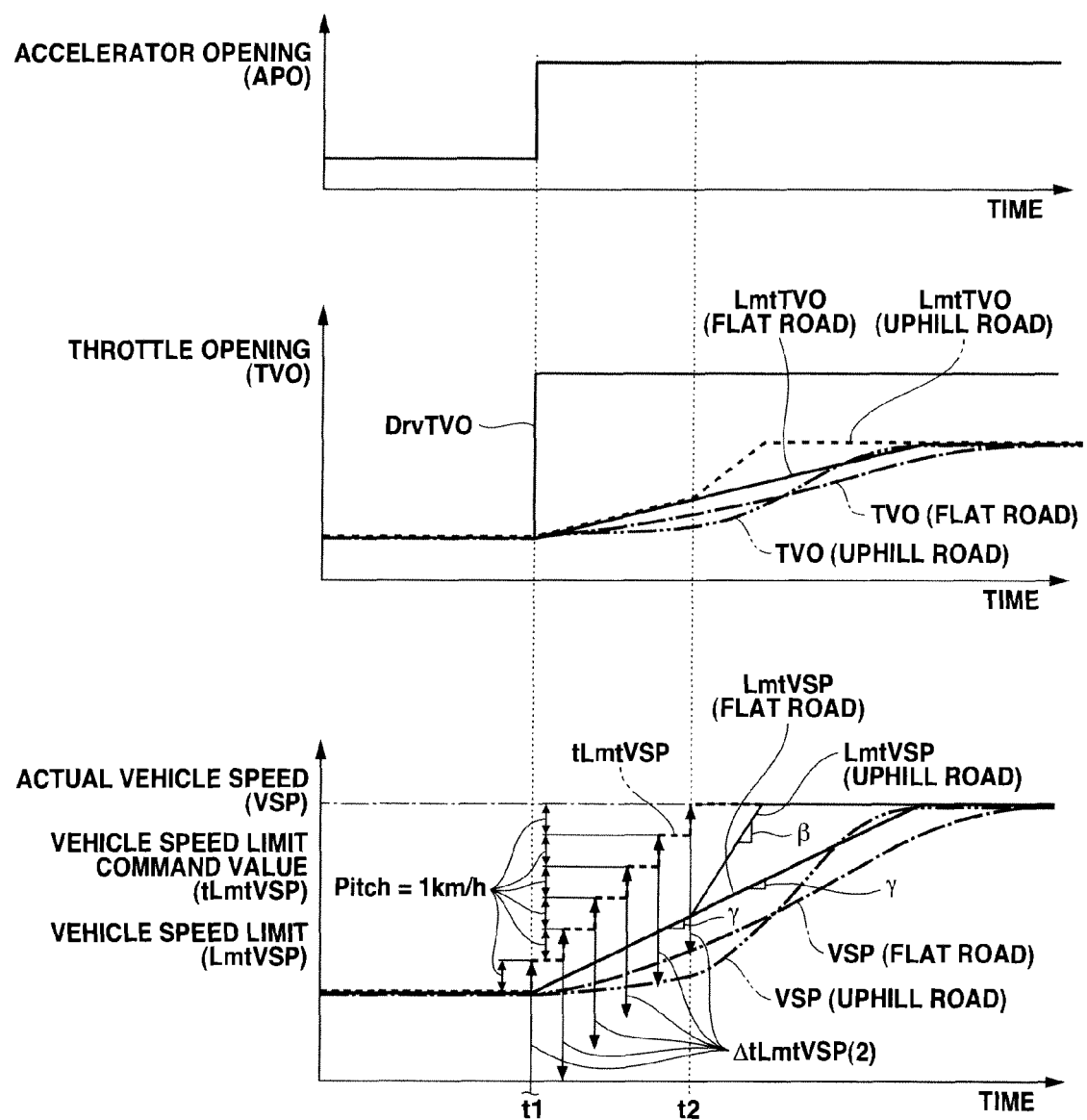
FIG. 4 is a time chart showing a process of setting of a vehicle speed limit with reference to an actual vehicle speed and problems associated therewith.

FIG. 4 shows a time chart of vehicle operation control, under the same operation conditions as those of FIG. 3, in the case of setting the time change rate of the vehicle speed limit LmtVSP to a small value γ when the vehicle speed deviation ΔVSP is smaller than the predetermined level ΔtLmtVSP(2) and setting the time change rate of the vehicle speed limit LmtVSP to a larger value β than γ when the vehicle speed deviation ΔVSP is greater than or equal to the predetermined level ΔtLmtVSP(2). As indicated by the dashed dotted line (flat road) and the dashed double-dotted line (uphill road), the time-series changes of the actual vehicle speed VSP differ under the influence of the running resistance such as road inclination of the vehicle. On the flat road where the running resistance is low, the time change rate of the vehicle speed limit LmtVSP is always set to the small value γ as indicated by the solid thick line as the vehicle speed deviation ΔVSP is kept smaller than the predetermined level ΔtLmtVSP(2). On the uphill road where the running resistance is high, by contrast, the time change rate of the vehicle speed limit LmtVSP is set to the small value γ until the time instant t2 when the vehicle speed deviation ΔVSP reaches the predetermined level ΔtLmtVSP(2) and is set to the large value β after the time instant t2 as indicated by the solid thin line.

Namely, the time change rate of the vehicle speed limit LmtVSP differs depending on the running resistance such as road inclination etc. of the vehicle even when the driver performs the same vehicle speed limit command changing operation under the same accelerator operation condition. Even though the driver performs the same vehicle speed limit command changing operation under the same driving conditions, the time change rate of the vehicle speed limit LmtVSP differs from its previous value so that the driver would feel that it is difficult to learn the vehicle speed limit command changing operation due to the lack of repeatability of the vehicle speed limit LmtVSP with respect to the vehicle speed limit command changing operation and would have an uncomfortable feeling during the vehicle speed limit changing operation due to the difference between the actual and expected time change rate of the vehicle speed limit LmtVSP. This becomes a large problem in practical use. There also occurs a problem of an inverse phenomenon in which the rate of increase of the vehicle speed VSP becomes larger on the uphill road than on the flat road, which gives an uncomfortable feeling to the driver.

In the present embodiment, the change rate of the vehicle speed limit LmtVSP is set to the same value on the flat road and on the uphill road as is apparent from FIG. 3 without the influence of the vehicle running conditions such as road inclination. It is thus possible to secure the repeatability of the vehicle speed limit LmtVSP with respect to the vehicle speed limit command changing operation so that the driver can easily learn the vehicle speed limit command changing operation and expect the time change rate of the vehicle speed limit LmtVSP from the vehicle speed limit command changing operation. Further, the rate of increase of the vehicle speed VSP always becomes larger on the flat road than on the uphill road as is apparent from the changes of the actual vehicle speed VSP on the flat road and the uphill road in FIG. 3. It is thus possible to avoid the occurrence of the inverse phenomenon in which the rate of increase of the vehicle speed VSP becomes larger on the uphill road than on the flat road as mentioned above with reference to FIG. 4.

FIG. 5 shows changes of the vehicle speed limit command value tLmtVSP with respect to time in the case of performing a single tap operation of the SET switch at the time instant t1 and then performing a long tap operation of the SET switch at the time instant t2 after the lapse of a long time from the time instant t1 that does not comply with the given time condition.

The vehicle speed limit command value tLmtVSP is increased from the initial vehicle speed limit command value tLmtVSP(0) by a small pitch of Pitch=1 km/h by the single tap operation of the SET switch at the time instant t1, and then, is increased from the initial vehicle speed limit command value tLmtVSP(0) by a large pitch of Pitch=10 km/h by the long tap operation of the SET switch at the time instant t2 as indicated by the broken line.

At the time instant t1 when the vehicle speed limit command value tLmVSP is increased by a pitch of Pitch=1 km/h by the single tap operation of the SET switch, the vehicle speed deviation ΔVSP is smaller than the predetermined vehicle speed deviation level ΔVSPs (19 km/s) (step S14); and the vehicle speed limit command difference ΔtLmtVSP is smaller than the predetermined second vehicle speed limit command difference level ΔtLmtVSP(2)=4.8 km/h (step S17). The time change rate of the vehicle speed limit LmtVSP is thus set to a small value γ (step S19). Then, the vehicle speed limit LmtVSP is gradually increased at such a small time change rate γ as indicated by the solid line relative to the stepwise change of the vehicle speed limit command value tLmtVSP after the time instant t1.

At the time instant t2 when the vehicle speed limit command value tLmVSP is increased by a pitch of Pitch=10 km/h by the long tap operation of the SET switch, the vehicle speed deviation ΔVSP is smaller than the predetermined vehicle speed deviation level ΔVSPs (19 km/s) (step S14); and the vehicle speed limit command difference ΔtLmtVSP is between the predetermined first vehicle speed limit command difference level ΔtLmtVSP(2)=15 km/h and the predetermined second vehicle speed limit command difference level ΔtLmtVSP(2)=4.8 km/h (step S17). The time change rate of the vehicle speed limit LmtVSP is thus set to a middle value β (step S20). Then, the vehicle speed limit LmtVSP is gradually increased at such a middle time change rate β as indicated by the solid line relative to the stepwise change of the vehicle speed limit command value tLmtVSP after the time instant t2.

The vehicle speed limit LmtVSP is consequently determined as indicated by the solid line in FIG. 5.

FIG. 6 shows changes of the vehicle speed limit command value tLmtVSP with respect to time in the case of performing two long tap operations on the SET switch successively (two successive long tap operations of the SET switch) at the time instants t1 and t2 in compliance with the give time condition.

The vehicle speed limit command value tLmtVSP is increased successively twice, by a large pitch of Pitch=10 km/h by each of the long tap operations of the SET switch, from the initial vehicle speed limit command value tLmtVSP (0) immediately before the time instant t1, as indicated by the broken line.

At the time instant t1 when the vehicle speed limit command value tLmtVSP is first increased by a pitch of Pitch=10 km/h, the vehicle speed deviation ΔVSP is smaller than the predetermined vehicle speed deviation level ΔVSPs (19 km/s) (step S14); and the vehicle speed limit command difference ΔtLmtVSP is between the predetermined first vehicle speed limit command difference level ΔtLmtVSP(2)=15 km/h and the predetermined second vehicle speed limit command difference level ΔtLmtVSP(2)=4.8 km/h (step S17). The time change rate of the vehicle speed limit LmtVSP is thus set to a middle value β (step S20). Then, the vehicle speed limit LmtVSP is gradually increased at such a middle time change rate β as indicated by the solid line relative to the stepwise change of the vehicle speed limit command value tLmtVSP after the time instant t1.

At the time instant t2 when the vehicle speed limit command value tLmtVSP is next increased by a pitch of Pitch=10 km/h, the vehicle speed deviation ΔVSP is greater than or equal to the predetermined vehicle speed deviation level ΔVSPs (19 km/s) (step S14). The time change rate of the vehicle speed limit LmtVSP is thus set to a large value δ (step S15).

As the time change rate δ is determined so as to achieve the following response of the vehicle speed limit LmtVSP to the vehicle speed limit command value tLmtVSP as required in the large vehicle speed deviation range as explained above, it is possible to achieve the following response of the vehicle speed limit LmtVSP to the vehicle speed limit command value tLmtVSP as required.

Herein, the rate of increase of the actual vehicle speed limit VSP becomes larger than that indicated in FIG. 6 when the running resistance is lower on a downhill road etc. At the time instant t2, the vehicle speed limit command difference ΔtLmtVSP between the initial vehicle speed limit command value tLmtVSP(0) immediately before the time instant t1 and the current changed vehicle speed limit command value tLmtVSP is greater than or equal to the predetermined first vehicle speed limit command difference level ΔtLmtVSP(2)= 15 km/h (step S16) even though the vehicle speed deviation ΔVSP is smaller than the predetermined vehicle speed deviation level ΔVSPs (19 km/s) (step S14). The time change rate of the vehicle speed limit VSP is thus set to a large value α (step S18). Then, the vehicle speed limit LmtVSP is gradually changed at such a large time change rate a after the time instant t2 relative to the stepwise change of the vehicle speed limit command value tLmtVSP as indicated by the solid line.

In consequence, the vehicle speed limit LmtVSP is determined as indicated by the solid line in FIG. 6.

In the present embodiment, in either of the cases of FIGS. 5 and 6, the vehicle speed limit LmtVSP is changed at the given time change rate α, β, γ, δ relative to the change of the vehicle speed limit command value tLmtVSP (at the time instants t1 and t2 in FIGS. 5 and 6). The vehicle speed limit LmtVSP is not changed stepwisely in response to the change of the vehicle speed limit command value tLmtVSP but is gradually changed to the changed vehicle speed limit command value tLmtVSP at the given time change rate α, β, γ, δ. The throttle opening TVO, which is controlled according to the throttle opening command value tTVO so as to achieve the target driving force for the vehicle speed limit, is changed more smoothly immediately after the time instant t1, t2 as typically indicated by the solid line in FIG. 5 than the conventional trend as indicated by the broken line. It is accordingly possible to control the vehicle speed limit LmtVSP according to the vehicle speed limit command value tLmtVSP without causing a large change in driving force due to a sudden change of the vehicle speed limit LmtVSP immediately after the time instant t1, t2 and thereby without giving an uncomfortable feeling to the driver.

When the vehicle speed deviation ΔVSP between the vehicle speed limit command value tLmtVSP and the actual vehicle speed VSP is greater than or equal to the relatively large predetermined vehicle speed deviation level ΔVSPs (step S14), the time change rate of the vehicle speed limit LmtVSP is set to the large value δ as indicated at or after the time instant t2 in FIG. 6 (step S15). It is thus possible to achieve the following response of the vehicle speed limit LmtVSP to the vehicle speed limit command value tLmtVSP in preference to the resolution of the driver's uncomfortable feeling problem caused due to the change in driving force.

When the vehicle speed deviation ΔVSP is smaller than the relatively large predetermined vehicle speed deviation level ΔVSPs (step S14), i.e., when higher priority is placed on the resolution of the driver's uncomfortable feeling problem caused due to the change in driving force rather than on the following response of the vehicle speed limit LmtVSP to the vehicle speed limit command value tLmtVSP, the time change rate of the vehicle speed limit LmtVSP is determined in such a manner that the time change rate of the vehicle speed limit LmtVSP decreases with the vehicle speed limit command difference ΔtLmtVSP between the current vehicle speed limit command value tLmtVSP changed by the tap operation(s) and the initial vehicle speed limit command value tLmtVSP(0) before the tap operation(s) (steps S16 to S19). More specifically, the time change rate of the vehicle speed limit LmtVSP is decreased as follows in response to the decrease of the vehicle speed limit command difference ΔtLmtVSP.

(1) When the vehicle speed limit command difference ΔtLmtVSP is greater than or equal to the predetermined, relatively large first vehicle speed limit command difference level ΔtLmtVSP(1) (step S16), the time change rate of the vehicle speed limit LmtVSP is set to the large value δ (step S18) as indicated at the time instant t2 in FIG. 6.

(2) When the vehicle speed limit command difference ΔtLmtVSP is smaller than the predetermined, relatively small second vehicle speed limit command difference level ΔtLmtVSP(2) (step S17), the time change rate of the vehicle speed limit LmtVSP is set to the small value γ (step S19) as indicated at and after the time instant t2 in FIG. 5.

(3) When the vehicle speed limit command difference ΔtLmtVSP is between the first vehicle speed limit command difference level ΔtLmtVSP(1) and the second vehicle speed limit command difference level ΔtLmtVSP(2) (step S17), the time change rate of the vehicle speed limit LmtVSP is set to the middle value (step S20) as indicated at and after the time instant t2 in FIG. 5 and during the time period from the time instant t1 to the time instant t2 in FIG. 6.

It is thus possible in the cases of FIGS. 5 and 6, as in the case of FIG. 3, to assuredly eliminate the driver's uncomfortable feeling problem caused due to the change in driving force, which is different in degree depending on the vehicle speed limit command difference ΔtLmtVSP, by setting the appropriate, not-too-large, not-too-small time change rate of the vehicle speed limit LmtVSP no matter what value the vehicle speed limit command difference ΔtLmtVSP takes, i.e., no matter how the vehicle speed limit command changing operation of the vehicle speed limit control switch 22a is performed.

The above explanations of FIGS. 3, 5 and 6 each refer to the case of increasing the vehicle speed limit command value tLmtVSP by the operations of the SET switch. It is however needless to say that it is possible to obtain the same effects in the case of decreasing the vehicle speed limit command value tLmtVSP by the operations of the RES switch as those in the case of increasing the vehicle speed limit command value tLmtVSP by the operations of the SET switch.

In the present embodiment, the control for determination of the time change rate α, β, γ, δ of the vehicle speed limit LmtVSP is basically performed on the basis of the vehicle speed limit command difference ΔtLmtVSP for the above-mentioned reasons. There is however a case that the followability of the actual vehicle speed VSP to the vehicle speed limit LmtVSP becomes sluggish under inconceivable circumstances. As an insurance against such a case, the vehicle speed deviation ΔVSP is used auxiliarily for determination of the vehicle speed limit time change rate in the above embodiment. It is thus certainly preferable, but not essential, to use the vehicle speed deviation ΔVSP in combination with the vehicle speed limit command difference for determination of the time change rate of the vehicle speed limit LmtVSP.

The present invention has been described above with reference to, but is not limited to the above specific embodiments. Various modifications and variations of the embodiments described above will occur to those skilled in the art without departing from the scope of the present invention.

The invention claimed is:

1. A vehicle speed limit control device for an automotive vehicle, comprising:
    a vehicle speed limit setting portion that sets and changes a vehicle speed limit of the vehicle according to a vehicle speed limit command value that can be changed depending on the number of operations of a vehicle speed limit command means in compliance with a given time condition;
    a vehicle speed detecting portion that detects an actual vehicle speed of the vehicle;
    a driving force control portion that controls a driving force of the vehicle based on the vehicle speed limit and the actual vehicle speed;
    a vehicle speed limit command difference calculating portion that calculates a vehicle speed limit command difference between an initial value of the vehicle speed limit command value immediately before an initial operation of the vehicle speed limit command means and a changed value of the vehicle speed limit command value at a current operation of the vehicle speed limit command means; and
    a vehicle speed limit change rate regulating portion that regulates a rate of change of the vehicle speed limit by the vehicle speed limit setting portion in such a manner that the rate of change of the vehicle speed limit decreases with the vehicle speed limit command difference.

2. The vehicle speed limit control device according to claim 1, further comprising:
    a vehicle speed deviation calculating portion that calculates a vehicle speed deviation between the actual vehicle speed and the changed vehicle speed limit command value;
    a vehicle speed limit change rate control portion that, when the vehicle speed deviation is greater than a predetermined level, controls the rate of change of the vehicle speed limit in such a manner that the rate of change of the vehicle speed limit increases with the vehicle speed deviation, instead of allowing the vehicle speed limit change rate regulating portion to regulate the rate of change of the vehicle speed limit.

3. A vehicle speed limit control device for an automotive vehicle, comprising:
    a vehicle speed sensor that detects an actual vehicle speed of the vehicle;
    a vehicle speed limit command switch operated at a vehicle speed limit control request of a driver; and
    a vehicle speed limit control mechanism that sets a vehicle speed limit and controls a driving force of the vehicle in such a manner as to avoid the actual vehicle speed from exceeding the vehicle speed limit,
    wherein the vehicle speed limit control mechanism is configured to:
    change a vehicle speed limit command value depending on an operation condition of the vehicle speed limit command switch;
    change the vehicle speed limit according to the vehicle speed limit command value;
    calculate a vehicle speed limit command difference between an initial value of the vehicle speed limit command value immediately before an operation of the vehicle speed limit command switch and a current value of the vehicle speed limit command value changed by the operation of the vehicle speed limit command switch;

when the vehicle speed limit command difference is greater than or equal to a predetermined first difference level, regulate a rate of change of the vehicle speed limit to a first change rate;

when the vehicle speed limit command difference is smaller than a predetermined second difference level, regulate the rate of change of the vehicle speed limit to a second change rate that is smaller than the first change later;

when the vehicle speed limit command difference is greater than or equal to the predetermined second difference level and is smaller than the predetermined first difference level, regulate the rate of change of the vehicle speed limit to a third change rate that is between the first change rate and the second change rate; and control the driving force of the vehicle based on the actual vehicle speed and the vehicle speed limit.

4. The vehicle speed limit control device according to claim 3, wherein the vehicle speed limit control mechanism is configured to calculate a vehicle speed deviation between the actual vehicle speed and the changed vehicle speed limit command value and, when the vehicle speed deviation is greater than or equal to a predetermined level, set the rate of change of the vehicle speed limit to a fourth change rate that is larger than or equal to the first change rate.

5. The vehicle speed limit control device according to claim 4, wherein the forth change rate increases with the vehicle speed deviation.

6. A vehicle speed limit control method for an automotive vehicle, the vehicle comprising a vehicle speed limit command switch operated at a vehicle speed limit control request of a driver, the vehicle speed limit control method comprising:

detecting an actual vehicle speed of the vehicle;

changing a vehicle speed limit command value depending on an operation condition of the vehicle speed limit command switch;

changing a vehicle speed limit according to the vehicle speed limit command value;

calculating a vehicle speed limit command difference between an initial value of the vehicle speed limit command value immediately before an operation of the vehicle speed limit command switch and a current value of the vehicle speed limit command value changed by the operation of the vehicle speed limit command switch;

regulating a rate of change of the vehicle speed limit in such a manner that the rate of change of the vehicle speed limit decreases with the vehicle speed limit command difference; and controlling a driving force of the vehicle based on the actual vehicle speed and the vehicle speed limit.

* * * * *